United States Patent
Chen et al.

(10) Patent No.: US 9,369,063 B2
(45) Date of Patent: Jun. 14, 2016

(54) OUTPUT POWER ADJUSTING METHOD FOR INVERTER

(71) Applicant: INDUSTRIAL TECHNOLOGY RESEARCH INSTITUTE, Hsinchu (TW)

(72) Inventors: Po-Li Chen, Changhua County (TW); Pao-Chuan Lin, Zhubei (TW); Ming-Hung Yu, Miaoli (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 14/566,430

(22) Filed: Dec. 10, 2014

(65) Prior Publication Data

US 2016/0099659 A1    Apr. 7, 2016

(30) Foreign Application Priority Data

Oct. 1, 2014    (TW) .............................. 103134279 A

(51) Int. Cl.
*H02M 7/44*    (2006.01)

(52) U.S. Cl.
CPC ....................................... *H02M 7/44* (2013.01)

(58) Field of Classification Search
CPC ... H02M 1/32; H02M 3/156; H02M 3/33507; H02M 3/28; H02M 7/48; H02M 7/537; H02M 7/003; G05B 11/016; G05F 1/52; G05F 1/67; H02J 7/35; H02J 13/0041
USPC ...................... 363/15, 16, 55, 56.01, 95, 131; 323/299, 906; 307/140
See application file for complete search history.

(56) References Cited

U.S. PATENT DOCUMENTS 6,118,675 A * 9/2000 Lionetto ................. H02M 1/36 363/21.13
6,744,649 B1 * 6/2004 Yang .................... H02M 3/3376 363/132

(Continued)

FOREIGN PATENT DOCUMENTS

CN    101904073 B    1/2014
TW    201107925 A    3/2011

(Continued)

OTHER PUBLICATIONS

Intellectual Property Office, Ministry of Economic Affairs, R.O.C., "Office Action", Aug. 25, 2015, Taiwan.

(Continued)

*Primary Examiner* — Adolf Berhane
(74) *Attorney, Agent, or Firm* — Locke Lord LLP; Tim Tingkang Xia, Esq.

(57) ABSTRACT

An output power adjusting method is applied on an inverter. The inverter includes a capacitor to store direct current (DC) electricity provided by a photovoltaic (PV) module. At least the DC electricity provided by the PV module is converted into alternating current (AC) electricity. Determine whether a power value of the AC electricity exceeds a power threshold. When the AC electricity exceeds the power threshold, the inverter works in a continuous mode. When the AC electricity does not exceed the power threshold, the inverter works in a discontinuous mode where the PV module charges the capacitor. In the discontinuous mode, determine whether a voltage on the capacitor exceeds a reference voltage, and when the voltage on the capacitor exceeds the reference voltage, the DC electricity provided by the PV module and DC electricity in pulses provided by the capacitor are converted to the AC electricity.

9 Claims, 7 Drawing Sheets

(56) References Cited

U.S. PATENT DOCUMENTS

| | | | |
|---|---|---|---|
| 7,986,122 B2 | 7/2011 | Fornage et al. | |
| 7,986,539 B2 | 7/2011 | Fornage | |
| 8,492,932 B1 | 7/2013 | Fornage | |
| 9,154,032 B1* | 10/2015 | Beijer | G05F 1/67 |
| 2005/0099827 A1* | 5/2005 | Sase | H02M 3/33592 |
| | | | 363/16 |
| 2005/0189822 A1* | 9/2005 | Namba | H05B 33/0818 |
| | | | 307/149 |
| 2009/0027926 A1* | 1/2009 | Yang | H02M 3/33592 |
| | | | 363/21.14 |
| 2009/0251933 A1 | 10/2009 | Angerer et al. | |
| 2010/0124081 A1* | 5/2010 | Morota | H02M 3/33507 |
| | | | 363/21.16 |
| 2010/0157629 A1* | 6/2010 | Yoshikawa | H02M 1/36 |
| | | | 363/21.01 |
| 2010/0157634 A1 | 6/2010 | Yu et al. | |
| 2010/0181837 A1 | 7/2010 | Seeker et al. | |
| 2010/0309695 A1 | 12/2010 | Fornage | |
| 2011/0088748 A1 | 4/2011 | Lee | |
| 2011/0292701 A1 | 12/2011 | Fornage | |
| 2012/0044724 A1* | 2/2012 | Morota | H02M 3/33523 |
| | | | 363/21.17 |
| 2013/0094268 A1 | 4/2013 | Chapman et al. | |
| 2013/0141002 A1* | 6/2013 | Esaki | H05B 33/0815 |
| | | | 315/224 |
| 2013/0250636 A1* | 9/2013 | Arimura | H02M 7/797 |
| | | | 363/78 |
| 2014/0226369 A1* | 8/2014 | Kimura | H02M 3/3376 |
| | | | 363/21.09 |
| 2015/0098045 A1* | 4/2015 | Imanaka | H05B 33/0815 |
| | | | 349/69 |
| 2015/0207423 A1* | 7/2015 | Ganesh Kumar | H02M 3/33553 |
| | | | 363/21.05 |

FOREIGN PATENT DOCUMENTS

| | | |
|---|---|---|
| TW | 201220014 A | 5/2012 |
| TW | 201407917 A | 2/2014 |

OTHER PUBLICATIONS

Kyungmin Lee et al., Improvement of power-conversion efficiency at light-load using a variable-duty burst mode, IEEE, 2013, 142-146.

Weiyi Feng et al., Optimal Trajectory Control of Burst Mode for LLC Resonant Converter, IEEE Transactions on power Electronics, 2013, 457-466, vol. 28, No. 1.

S. M. Chen et al., Single DC/AC CCFL Inverter for Large Size LCD TV with Burst Control, IEEE, APCCAS, 2006, 844-847.

Zheng Zhao et al., Utility grid impact with high penetration PV micro-inverters operating under burst mode using simplified simulation model, IEEE, 2011, 3928-3932.

Haibing Hu et al., Efficiency Improvement of Grid-Tied Inverters at Low Input Power Using Pulse-Skipping Control Strategy, IEEE Transactions on power Electronics, 2010, 3129-3138, vol. 25, No. 12.

* cited by examiner

US 9,369,063 B2

OUTPUT POWER ADJUSTING METHOD FOR INVERTER

CROSS-REFERENCE TO RELATED APPLICATIONS

This non-provisional application claims priority under 35 U.S.C. §119(a) on Patent Application No(s). 103134279 filed in Taiwan, R.O.C. on Oct. 1, 2014, the entire contents of which are hereby incorporated by reference.

TECHNICAL FIELD

The disclosure relates to an output power adjusting method.

BACKGROUND

When illuminance is weak, a photovoltaic (PV) module only supplies DC electricity with a lower power value to an inverter. Herein, the inverter may have lower conversion efficiency because of the power consumption of the control circuit in the inverter. In addition, since the input of the inverter is a DC type but the output of the inverter is an AC type, when the PV module provides stable DC electricity to the inverter, the input of the inverter will be affected by ripples caused by the output of the inverter. Therefore, under weak illumination condition, the power generation system cannot achieve its maximum output power.

Accordingly, it is necessary for the inverter to maintain its output power and have a better conversion efficiency to increase the accuracy of tracking the maximum output power when the PV module provides low power.

SUMMARY

According to one or more embodiments, the disclosure provides an output power adjusting method applied to an inverter including a capacitor. In one embodiment, the output power adjusting method includes the following steps. First, at least convert first direct current (DC) electricity of a PV module into first alternating current (AC) electricity, and determine whether a power value of the AC electricity is larger than a power threshold. Control the inverter to operate in a continuous mode when the power value of the AC electricity is larger than the power threshold. Control the inverter to operate in a discontinuous mode when the power value of the AC electricity is not larger than the power threshold. In the discontinuous mode, the capacitor is charged by the DC electricity of the PV module. Determine whether a voltage on the capacitor is larger than a reference voltage in the discontinuous mode. Control the capacitor to output DC electricity by pulses when the voltage on the capacitor is larger than the reference voltage in the discontinuous mode. Convert the DC electricity of the PV module and the DC electricity of the capacitor into AC electricity.

BRIEF DESCRIPTION OF THE DRAWINGS

The present disclosure will become more fully understood from the detailed description given herein below for illustration only, thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
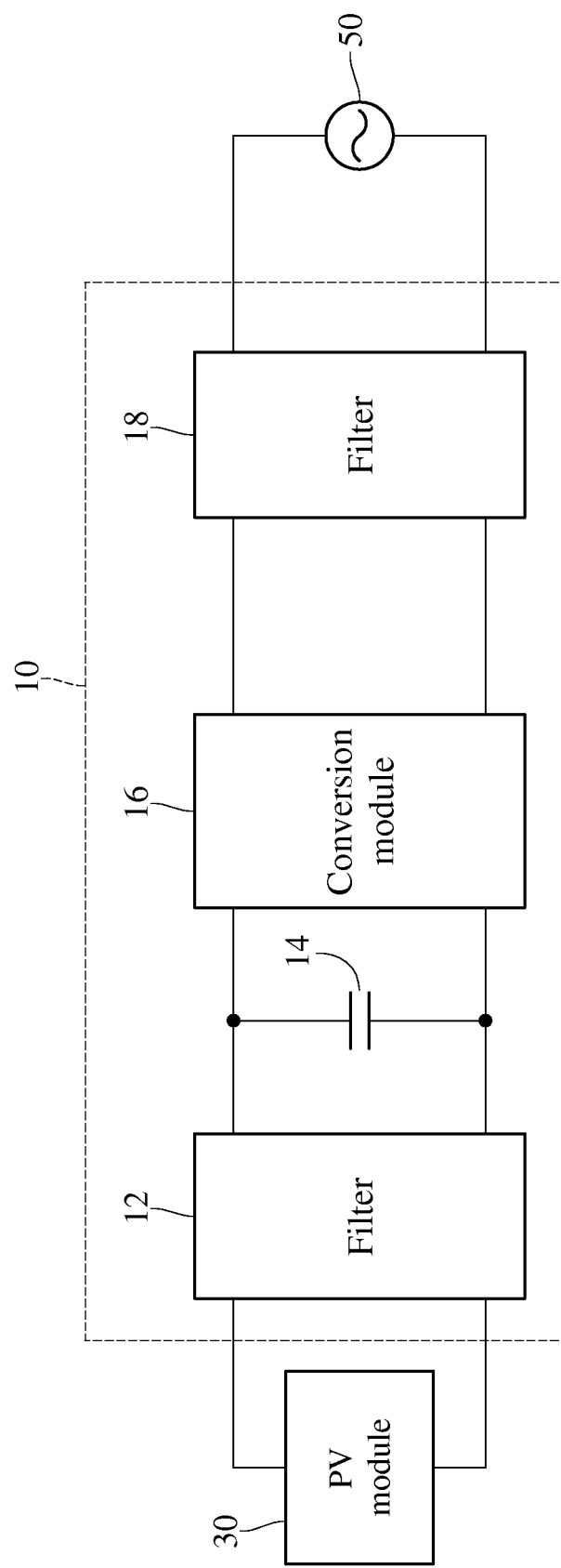
FIG. 1 is a schematic diagram of an embodiment of an inverter in the disclosure.
Figure 2:
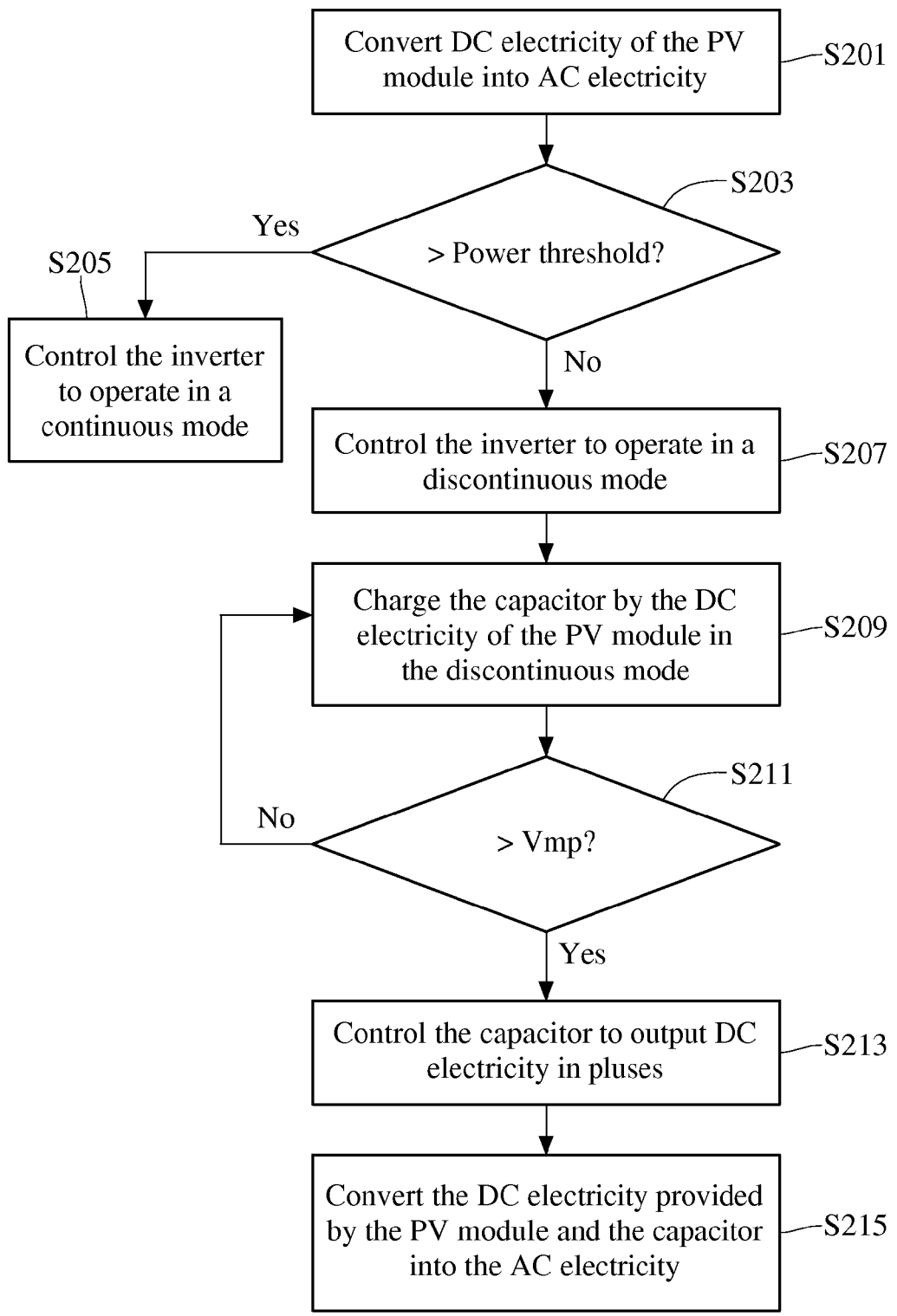
FIG. 2 is a flow chart of an embodiment of an output power adjusting method in the disclosure.
Figure 3:
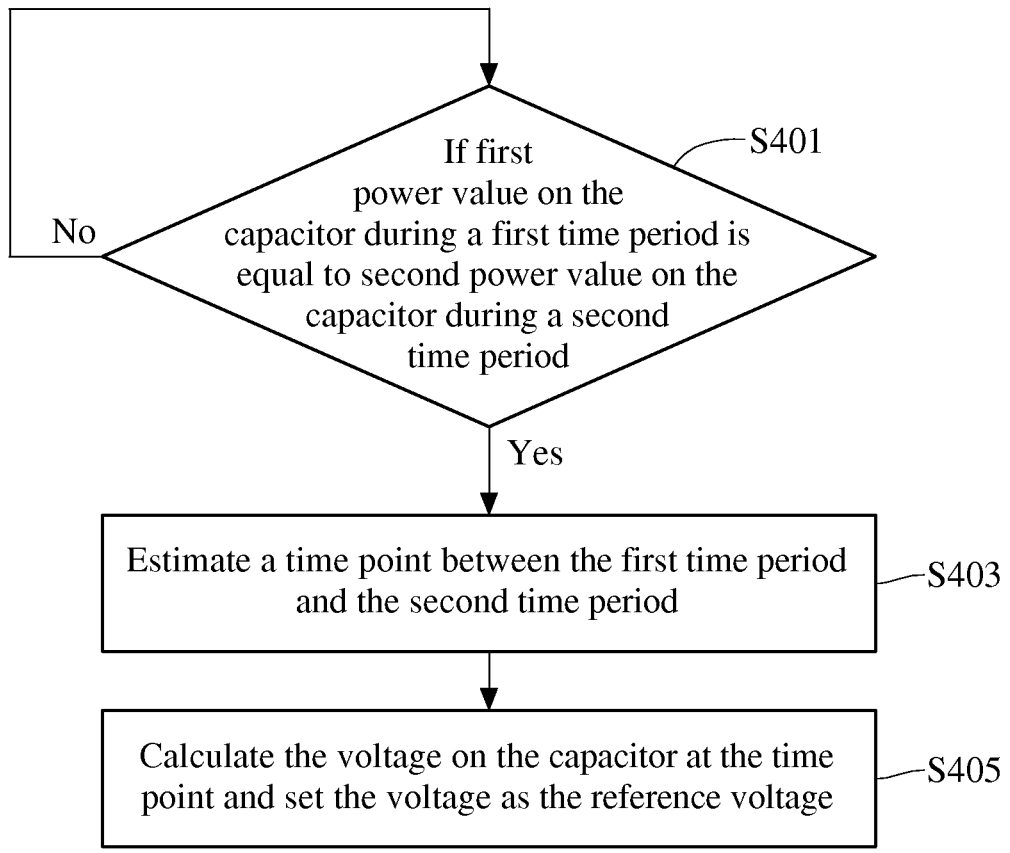
FIG. 3 is a flow chart of an embodiment of calculating a reference voltage in the disclosure.
Figure 4:
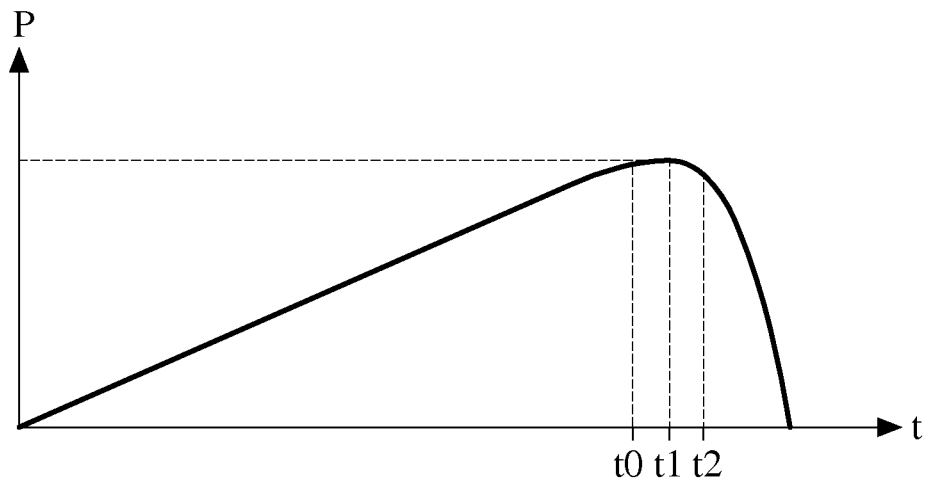
FIG. 4 is a timing diagram of an embodiment of the power value that the capacitor is charged in the disclosure.
Figure 5:
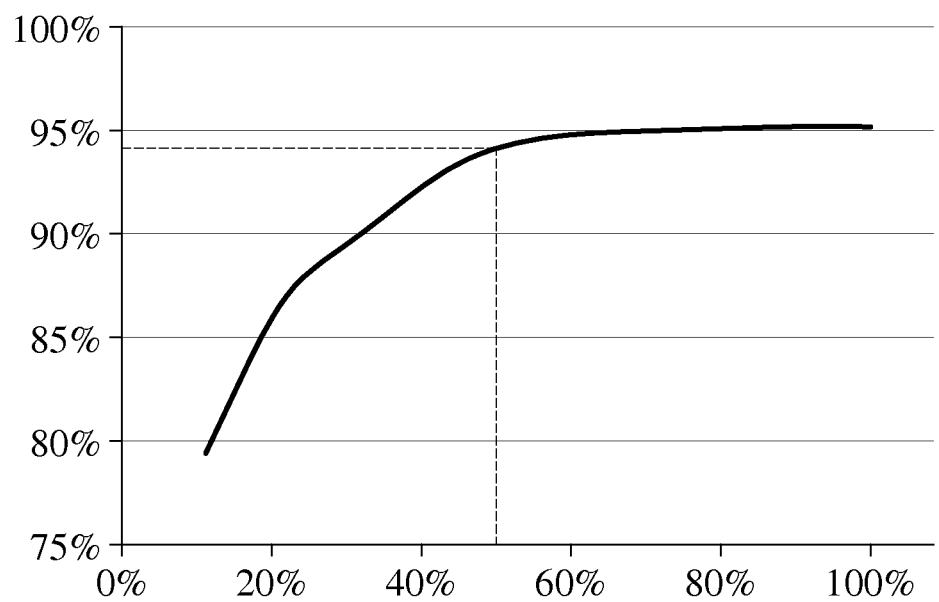
FIG. 5 is a curve diagram of an embodiment of conversion efficiency of the inverter in the disclosure.

Please refer to FIGS. 1 to 5. FIG. 1 is a schematic diagram of an embodiment of an inverter in the disclosure, FIG. 2 is a flow chart of an embodiment of an output power adjusting method in the disclosure, FIG. 3 is a flow chart of an embodiment of calculating a reference voltage in the disclosure, FIG. 4 is a timing diagram of an embodiment of the power value that the capacitor is charged in the disclosure, and FIG. 5 is a curve diagram of an embodiment of conversion efficiency of the inverter in the disclosure.

The output power adjusting method can be applied to an inverter 10. The inverter 10 includes, for example, an input terminal and an output terminal. The input terminal of the inverter 10 is coupled with a PV module 30 in order to receive DC electricity from the PV module 30. The inverter 10 includes, for example, a filter 12 and a capacitor 14 at the input side. The filter 18 can filter off noises in the DC electricity outputted by the PV module 30, store a part of the DC electricity of the PV module 30 in the capacitor 14, and transmit the rest of the DC electricity of the PV module 30 to a conversion module 16. The conversion module 16 can convert DC electricity into AC electricity, and the filter 18 at the output side of the inverter 10 can filter out noises in the AC electricity and output the filtered AC electricity. Therefore, the filtered AC electricity is merged into AC electricity of a mains electricity system 50.

As shown in FIG. 2, the output power adjusting method includes, for example, the following steps. In step S201, at least convert the DC electricity of the PV module 30 into AC electricity. In step S203, determine whether a power value of the AC electricity exceeds a power threshold. When the power value of the AC electricity exceeds the power threshold, the inverter 10 operates in a continuous mode in step S205. Otherwise, when the power value of the AC electricity does not exceed the power threshold, the inverter 10 operates in a discontinuous mode in step S207. In step S209, the PV module 30 in the discontinuous mode charges the capacitor 14 by its DC electricity. In step S211, determine whether the voltage on the capacitor 14 is higher than a reference voltage Vmp. When the voltage on the capacitor 14 is higher than the reference voltage Vmp, the capacitor 14 outputs DC electricity in pluses in step S213. In step S215, convert the DC electricity of the PV module 30 and the DC electricity of the capacitor 14 into AC electricity. The output power adjusting method is described in detail as follows.

In step S201, when the PV module 30 receives light with a higher intensity, when such light is converted into stronger DC electricity, the inverter 10 charges the capacitor 14 by a part of the DC electricity of the PV module 30 and transmits the rest of the DC electricity of the PV module 30 to the conversion module 16. The conversion module 16 converts the rest of the DC electricity of the PV module 30 into the AC electricity. When the capacitor 14 is charged completely (i.e. the voltage on the capacitor 14 reaches its upper limit), the inverter 10 supplies most of the DC electricity of the PV module 30 to the conversion module 16 in order to produce the AC electricity.

In step S203, the inverter 10 determines whether the power value of the AC electricity exceeds the power threshold. When the power value of the AC electricity produced by the DC electricity of the PV module 30 is larger than or equal to the power threshold, it indicates that the PV module 30 can still provide greater DC electricity. When the power value of the AC electricity produced by the DC electricity of the PV module 30 is smaller than the power threshold, it indicates that the DC electricity of the PV module 30 becomes weaker. Herein, the capacitor 14 will output the stored energy as DC electricity, and the DC electricity of the PV module 30 and the DC electricity of the capacitor 14 will be converted into the AC electricity. Therefore, the power value of the AC electricity herein is larger than or equal to the power threshold.

When the power value of the AC electricity produced by the DC electricity of the PV module 30 is smaller than the power threshold, the difference between the power threshold and the power value of the AC electricity produced by the DC electricity of the PV module 30 can be compensated by the DC electricity of the capacitor 14. Therefore, when the capacitor 14 outputs the DC electricity in a continuous waveform, it indicates that the inverter 10 operates in the continuous mode, as shown in step S205.

In step S207, when both the DC electricity of the PV module 30 and the DC electricity of the capacitor 14 are converted into the AC electricity is not larger than the power threshold yet, the inverter 10 operates in the discontinuous mode.

In step S209, the conversion module 16 in the discontinuous mode stops converting the DC electricity of the PV module 30 and the DC electricity of the capacitor 14 into the AC electricity. The PV module 30 charges the capacitor 14 by the DC electricity. When the capacitor 14 is being charged, the inverter 10 estimates the reference voltage Vmp. In step S401 in FIGS. 3 and 4, when the capacitor 14 is being charged, compare the first power value on the capacitor 14 accumulated during a first time period with a second power value on the capacitor 14 accumulated during a second time period. For example, the second time period follows the first time period. In step S403, when the difference between the first power value on the capacitor 14 accumulated during a first time period and the second power value on the capacitor 14 accumulated during a second time period is less than a preset value (for example, the difference between the power value at a time point t0 and the power value at a time point t2 is less than a preset value as shown in FIG. 4), a time point t1 between the time point t0 and the time point t2 is estimated.

In step S405, calculate the voltage on the capacitor 14 at the time point between the first time period and the second time period and set it as the reference voltage Vmp. For example, the voltage on the capacitor 14 at the time point t1 is set as the reference voltage Vmp. In step S211, after the reference voltage Vmp is obtained, since the capacitor 14 is still charged, the inverter 10 will determine whether the voltage on the capacitor 14 is higher than the reference voltage Vmp. Specifically, after the reference voltage Vmp is obtained, since the voltage on the capacitor 14 is higher than the reference voltage Vmp, the capacitor 14 outputs the DC electricity in pluses as shown in step S213. In step S213, the capacitor 14 outputs the DC electricity by outputting one pulse by one pulse, and the pulse and the DC electricity of the PV module 30 are converted into the AC electricity.

In order to clearly describe the pulses in step S213 and the power threshold, the following description will replace the power threshold by a first power threshold and refer to a conversion efficiency curve in FIG. 5, but the disclosure will not be limited thereto.

As shown in FIG. 5, the first power threshold is related to the maximum conversion efficiency and maximum output power of the inverter 10. In other words, the first power threshold is the maximum output power of the inverter 10 in the maximum conversion efficiency, and the second power threshold is the power received by the inverter 10 under the maximum conversion efficiency. The maximum conversion efficiency of the inverter 10 is the best ratio of DC electricity (i.e. input) to AC electricity (i.e. output) of the inverter 10.

In FIG. 5, the maximum conversion efficiency of the inverter 10 is about 95%. In the case of the inverter 10 having a maximum output power of 250 Watt (W), when the output power of the inverter 10 is 50% of the maximum output power (i.e. 125 W), the conversion efficiency of the inverter 10 sufficiently reaches the maximum conversion efficiency of 95%. Herein, the output power value of the inverter 10 is set as a first power threshold, about 125 W. If the power value of the AC electricity outputted by the inverter 10 is required to be about 125 W, the inverter 10 requires about 132 W (i.e. 125 W/95%=132 W) DC electricity as its input. The power value of the DC electricity received by the inverter 10 is set as a second power threshold, about 132 W. Notice that the curve of conversion efficiency in FIG. 5 is obtained when the inverter 10 operates in the continuous mode and the first power threshold and the second power threshold are obtained in the continuous mode, but the disclosure will not be limited thereto.

Accordingly, in step S213, the sum of the power value of each pulse provided by the capacitor 14 and the power value of the DC electricity provided by the PV module 30 is sufficiently equal to or slightly larger than the second power threshold. When the DC electricity of the PV module 30 and the DC electricity of the capacitor 14 are converted into the AC electricity, the AC electricity is synchronous to the AC electricity of the mains electricity system 50 and is inputted into the mains electricity system 50 at the zero crossing point of the AC electricity of the mains electricity system 50.

In practice, the aforementioned zero crossing point is a conversion point that an AV signal is changed from a positive voltage level to a negative voltage level or from a negative voltage level to a positive voltage level. The potential of the AV signal at the zero crossing point is about 0 Volt (V). When the AC electricity output by the inverter 10 is synchronous to the AC electricity of the mains electricity system 50 and is merged into the mains electricity system 50 at the zero crossing point where the AC electricity of the mains electricity system 50 is 0 V, the face difference between the AC electricity of the mains electricity system 50 and the AC electricity output by the inverter 10 may be avoided and electrical components in the mains electricity system 50 may be protected from overstress caused by overvoltage entering into the mains electricity system 50.

Figure 6A:
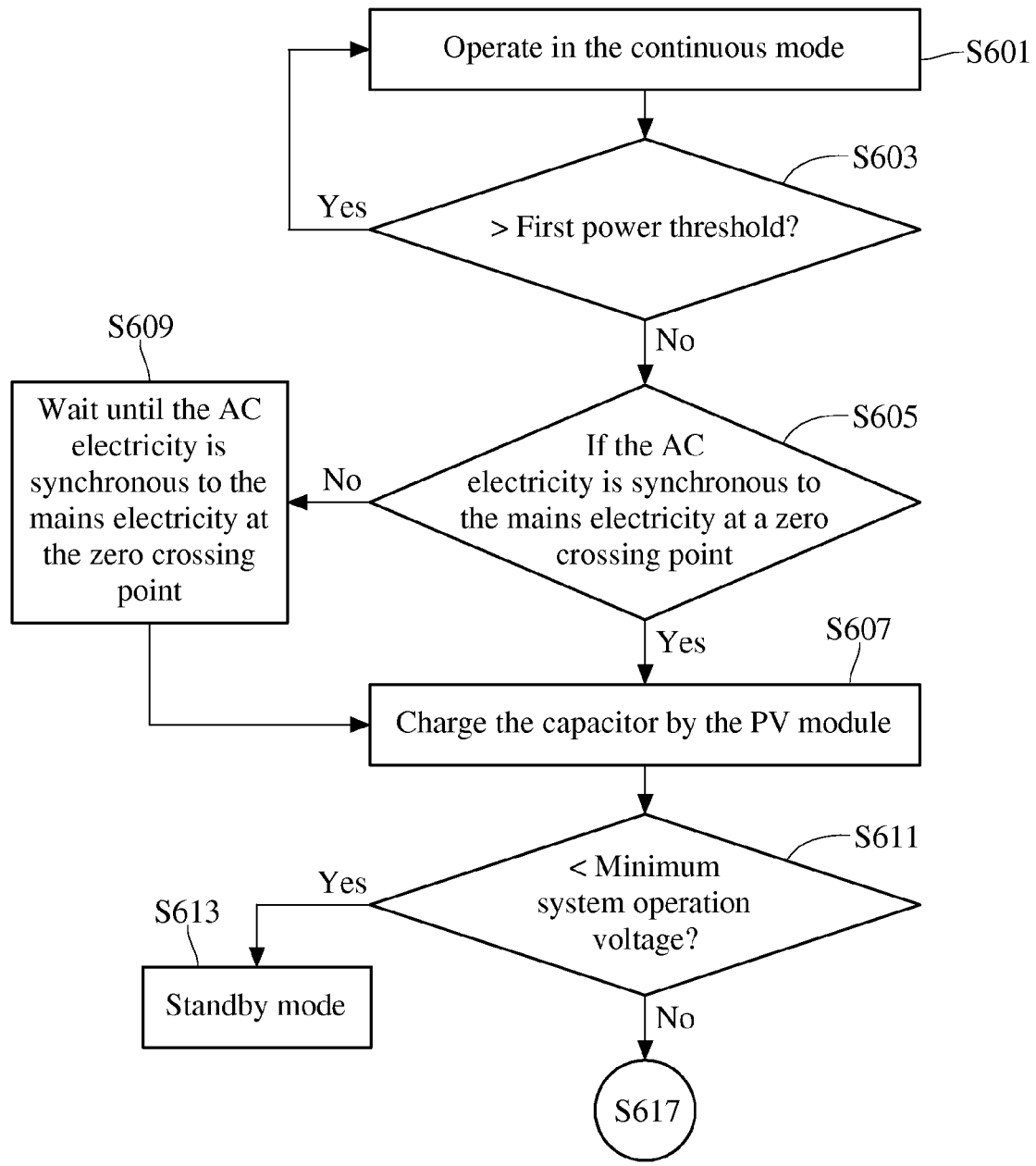
FIGS. 6A and 6B illustrate a flow chart of another embodiment of an output power adjusting method in the disclosure.
Figure 6B:
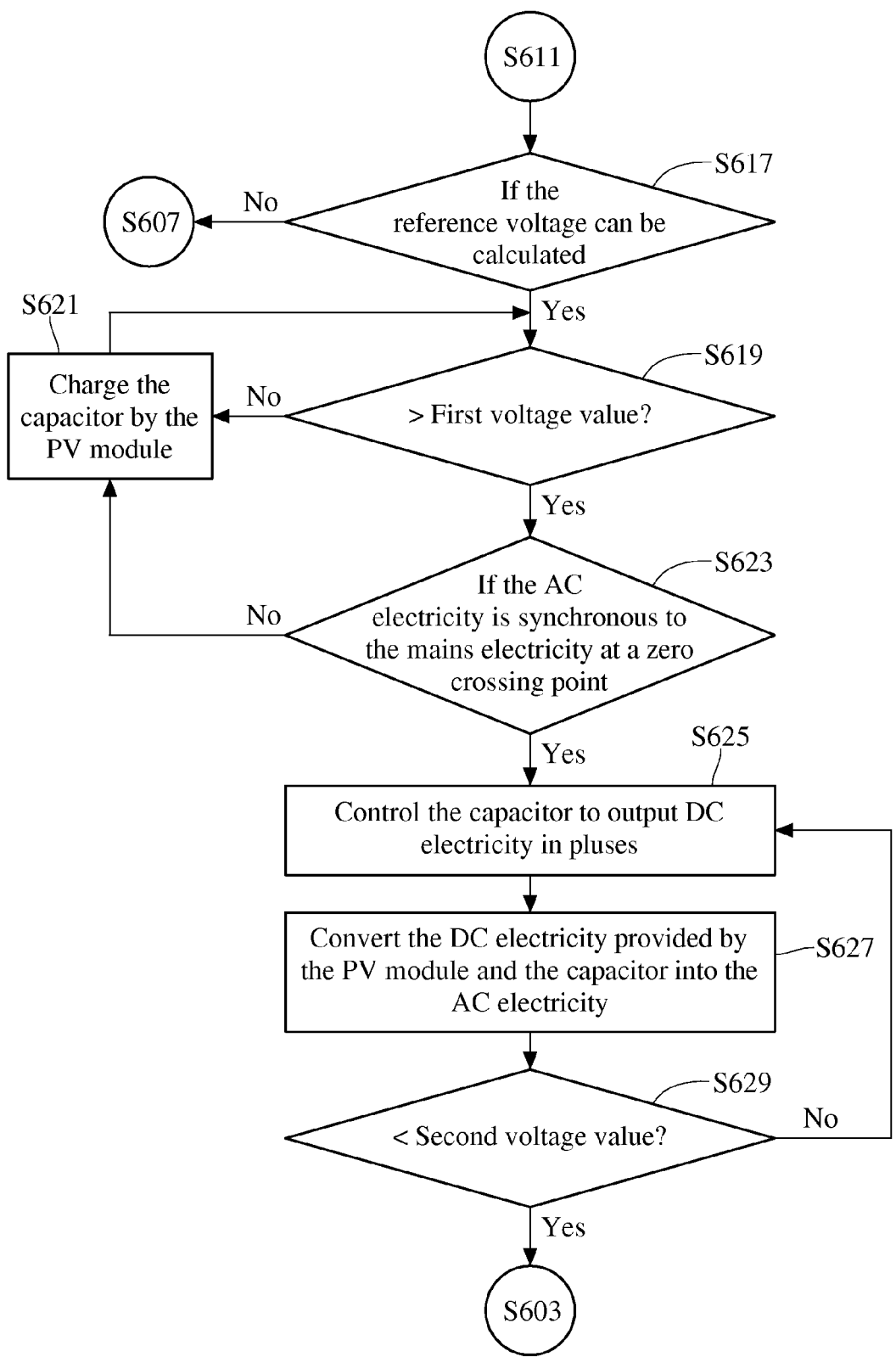
Figure 7:
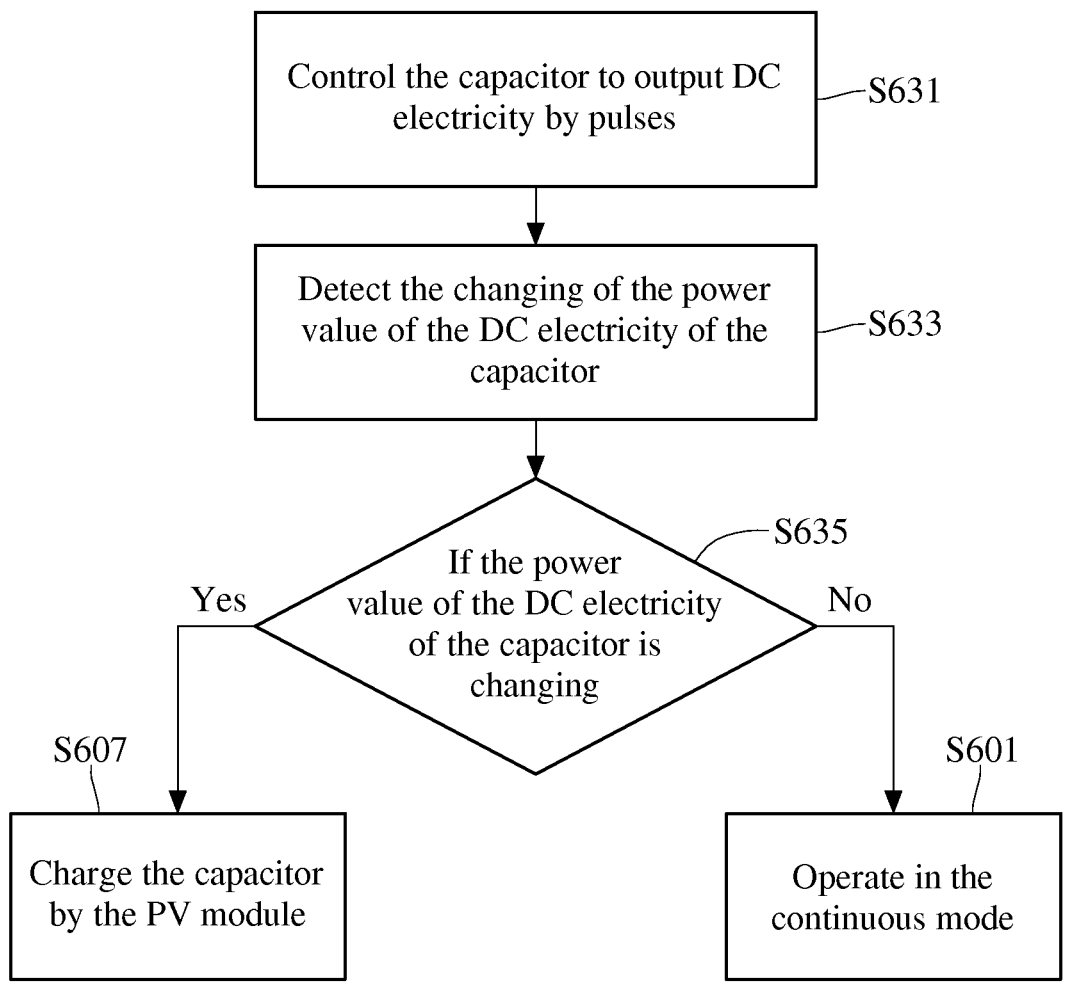
FIG. 7 is a flow chart of an embodiment of detecting the changing of a power value on the capacitor in the disclosure.

In order to clearly describe the output power adjusting method, please refer to FIGS. 1, 6A, 6B and 7. FIGS. 6A and 6B illustrate a flow chart of another embodiment of an output power adjusting method in the disclosure, and FIG. 7 is a flow chart of an embodiment of detecting the changing of a power value on the capacitor in the disclosure.

In step S601, the inverter 10 operates in the continuous mode initially. In step S603, determine whether the power value of the AC electricity converted from the DC electricity of the PV module 30 and the DC electricity of the capacitor 14 is larger than the first power threshold. When the power value of the AC electricity is larger than the first power threshold, it means that the DC electricity of the PV module 30 and the DC electricity of the capacitor 14 are enough to charge the capacitor 14 and convert DC electricity into AC electricity, and the inverter 10 continues operating in the continuous mode (i.e. the steps 601 and 603 are repeated) until the first power threshold is arrived.

In step S603, when the power value of the AC electricity converted from the DC electricity provided by the PV module 30 and the capacitor 14 is larger than the first power threshold, it means that the DC electricity provided by the PV module 30 may be much enough to match the demand for the AC electricity and then the inverter 10 continues determining whether the outputted AC electricity exceeds the first power threshold, as shown in S601. When the power value of the AC electricity converted from the DC electricity provided by the PV module 30 and the capacitor 14 is not larger than the first power threshold, it means that the DC electricity provided by the PV module 30 and the capacitor 14 is not much enough to make the power value of the AC electricity arrive the first power threshold. Herein, in step S605, determine whether the AC electricity output by the inverter 10 is synchronous to the mains electricity.

When the AC electricity output by the inverter 10 is asynchronous to the mains electricity at the zero crossing point, the inverter 10 continues producing the AC electricity until the AC electricity is synchronous to the mains electricity at the zero crossing point, as shown in step S609. When the AC electricity output by the inverter 10 is synchronous to the mains electricity at the zero crossing point, the inverter 10 will stop generating the AC electricity. Therefore, the inverter 10 may be prevented from a surfeit of stress on electrical components caused by suddenly draining away the power from these electrical components when the inverter 10 suddenly stops outputting original AC electricity in order to output greater AC electricity.

In step S607, the PV module 30 charges the capacitor 14 by its DC electricity. When the PV module is charging the capacitor 14, the inverter 10 determines whether the voltage on the capacitor 14 is lower than a minimum system operation voltage, as shown in step S611. When the voltage on the capacitor 14 is lower than the minimum system operation voltage, the inverter 10 enters into a standby mode (step S613). In the standby mode, the inverter 10 again determines whether the power value of the AC electricity output by the inverter 10 reaches the power threshold after a period of time. When the AC electricity output by the inverter 10 reaches the power threshold, the inverter 10 restarts to convert the DC electricity of the PV module 30. The minimum system operation voltage herein is a minimum voltage for the operation of the inverter 10, such as a minimum operation voltage for the operation of the control circuit of the inverter 10.

When the voltage on the capacitor 14 is not lower than the minimum system operation voltage in this system, the inverter 10 continues operating to charge the capacitor 14 by the PV module 30. When the PV module 30 is charging the capacitor 14, the inverter 10 attempts to calculate the reference voltage Vmp and determines whether the reference voltage Vmp can be calculated, as shown in step S617. The reference voltage Vmp can be calculated by, for example, comparing the DC electricity accumulated in the capacitor 14 during a first time period with the DC electricity accumulated in the capacitor 14 during a second time period, as shown in FIG. 3. The first time period and the second time period are in the duration of charging the capacitor 14. In this case, the voltage value on the capacitor 14 at the end point of the second time period (e.g. the time point t2 in FIG. 4) is set as a first voltage value, and the voltage value on the capacitor 14 at the starting point of the first time period (e.g. the time point t0 in FIG. 4) is set as a second voltage value. The first voltage value and the second voltage value are respectively a lower limit and an upper limit of a reference voltage range. The reference voltage Vmp (e.g. the voltage on the capacitor 14 at the time point t1 as shown in FIG. 4) is between the first voltage value and the second voltage value, that is, the reference voltage Vmp corresponds to the reference voltage range and in the reference voltage range.

As shown in step S617 in FIG. 6B, when the inverter 10 cannot calculate the reference voltage Vmp, the inverter 10 returns to step S607 and step S611 to determine whether there is enough DC electricity of the PV module 30 to charge the capacitor 14 and whether the voltage on the capacitor 14 is lower than the minimum system operation voltage in this system. When the inverter 10 calculates the reference voltage Vmp, it means that the first voltage value and the second voltage value can be obtained.

In step S619, the inverter 10 determines whether the voltage on the capacitor 14 is higher than the first voltage value. When the voltage on the capacitor 14 is not higher than the first voltage value, the PV module 30 continues charging the capacitor 14. When the voltage on the capacitor 14 is higher than the first voltage value, it means that the sum of the DC electricity provided by the capacitor 14 and the PV module 30 herein can make the inverter 10 have a better conversion efficiency, whereby the capacitor 14 is ready to output its DC electricity. Before the capacitor 14 outputs its DC electricity, the inverter 10 determines whether the AC electricity output by the inverter 10 herein is synchronous to the mains electricity at the zero crossing point, as shown in step S623. When the outputted AC electricity herein is synchronous to the mains electricity at the zero crossing point, the capacitor 14 outputs its DC electricity in pluses, as shown in step S625. In step S627, the inverter 10 converts the DC electricity provided by the PV module 30 and the capacitor 14 into the AC electricity and merges the AC electricity into the mains electricity.

After the capacitor 14 outputs its DC electricity by pulses, the inverter 10 determines whether the voltage on the capacitor 14 is lower than the second voltage value, as shown in step S629. When the voltage on the capacitor 14 is lower than the second voltage value, the inverter 10 again determines the power value of the AC electricity output by the inverter 10 is larger than the first power threshold, as shown in step S603. When the voltage on the capacitor 14 is not lower than the second voltage value, the capacitor 14 continues outputting its DC electricity in pluses, and the DC electricity provided by the PV module 30 and the capacitor 14 are converted into the AC electricity.

As shown in step S631 in FIG. 7, when the capacitor 14 is outputting its DC electricity by pulses, the inverter 10 determines the changing of the power value of the DC electricity of the capacitor 14. In step S633, when the power value of the DC electricity of the capacitor 14 is changing, it means that the power value of the AC electricity converted from the DC electricity of the PV module 30 does not reach the first power threshold. Therefore, the capacitor 14 needs to provide its DC electricity that will be converted with the DC electricity of the PV module 30 into the AC electricity. The power value of the AC electricity herein is larger than the first power threshold, and the method returns to step S611. When the power value of the DC electricity of the capacitor 14 is not changed or is stable and the voltage on the capacitor 14 approaches its upper limit, the inverter 10 returns to the continuous mode, as shown in step S601.

As set forth above, the output power adjusting method in the disclosure maintains the power value of the AC electricity of the inverter over a power threshold through detecting the AC electricity, whereby the inverter may have a better conversion efficiency to convert DC electricity into AC electricity. During a light load mode where the PV module provides weaker DC electricity, the inverter charges the capacitor at the input side of the conversion module by the DC electricity provided by the PV module 30, and during the charging of the capacitor, calculates a reference voltage to control whether the capacitor provides its DC electricity. Herein, the DC electricity provided by the PV module and the capacitor is converted into the AC electricity whose power value may be slightly larger than or sufficiently equal to the power threshold. Therefore, the inverter in such a light load mode may still have good conversion efficiency and higher performance.

What is claimed is:

1. An output power adjusting method applied to an inverter that comprises a capacitor, and comprising steps of:
    at least converting direct current (DC) electricity of a photovoltaic (PV) module into alternating current (AC) electricity;
    determining whether a power value of the AC electricity is larger than a power threshold;
    when the power value of the AC electricity is larger than the power threshold, controlling the inverter to operate in a continuous mode;
    when the power value of the AC electricity is not larger than the power threshold, controlling the inverter to operate in a discontinuous mode where the capacitor is charged by the DC electricity of the PV module;
    determining whether a voltage on the capacitor is larger than a reference voltage in the discontinuous mode;
    when the voltage on the capacitor is larger than the reference voltage in the discontinuous mode, converting the DC electricity of the PV module and DC electricity in pulses of the capacitor into the AC electricity;
    when the power value of the AC electricity is not larger than the power threshold, determining whether the AC electricity and mains electricity are synchronous; and
    stopping outputting the AC electricity at a zero crossing point of the mains electricity.

2. The output power adjusting method according to claim 1, wherein in the step of determining whether the power value of the AC electricity is larger than the power threshold, the AC electricity is obtained by converting the DC electricity of the PV module and DC electricity of the capacitor.

3. The output power adjusting method according to claim 1, wherein the step of at least converting the DC electricity of the PV module into the AC electricity comprises:
    charging the capacitor by a part of the DC electricity of the PV module; and
    converting the rest of the DC electricity of the PV module into the AC electricity.

4. The output power adjusting method according to claim 1, wherein after the step of converting the DC electricity of the PV module and the DC electricity of the charged capacitor into the AC electricity, the output power adjusting method further comprises:
    detecting a power value of the DC electricity of the capacitor;
    when the power value of the DC electricity of the capacitor is changed, controlling the inverter to operate in the discontinuous mode; and
    when the power value of the DC electricity of the capacitor is not changed, controlling the inverter to operate in the continuous mode.

5. The output power adjusting method according to claim 1, wherein the step of charging the capacitor by the DC electricity of the PV module in the discontinuous mode comprises:
    when the capacitor is being charged, comparing a first power value on the capacitor accumulated during a first time period with a second power value on the capacitor accumulated during a second time period;
    when a difference between the first power value on the capacitor accumulated during the first time period and the second power value on the capacitor accumulated during the second time period is less than a preset value, estimating a time point between the first time period and the second time period; and
    calculating the voltage on the capacitor at the time point for the reference voltage, wherein the reference voltage is in a reference voltage range, an upper limit of the reference voltage range is equal to a first voltage on the capacitor when the second time period ends, and a lower limit of the reference voltage range is equal to a second voltage on the capacitor when the first time period starts.

6. The output power adjusting method according to claim 5, wherein when the voltage on the capacitor is larger than the first voltage, the capacitor provides the DC electricity by the pulses.

7. The output power adjusting method according to claim 6, further comprising:
    after the capacitor outputs the DC electricity, determining whether the rest of the voltage on the capacitor is higher than the second voltage; and
    when the rest of the voltage on the capacitor is higher than the second voltage value, controlling the capacitor to continue outputting the DC electricity by the pulses, and converting the DC electricity of the PV module and the DC electricity of the capacitor into the AC electricity.

8. The output power adjusting method according to claim 7, wherein the step of controlling the capacitor to output the DC electricity by the pulses comprises:
    determining whether mains electricity is at a zero crossing point; and
    when the mains electricity is at the zero crossing point, controlling the capacitor to output the DC electricity by the pulses.

9. The output power adjusting method according to claim 1, wherein the power threshold is related to a maximum conversion efficiency and a maximum output power of the inverter, the maximum conversion efficiency is a ratio of output to input of the inverter.

* * * * *